US011128699B1

(12) United States Patent
Khurrum et al.

(10) Patent No.: US 11,128,699 B1
(45) Date of Patent: Sep. 21, 2021

(54) PREDICTIVE LOAD BALANCER CAPACITY SCALING

(71) Applicant: Amazon Technologies, Inc., Seattle, WA (US)

(72) Inventors: Mian Zainulabadin Khurrum, Redmond, WA (US); Evgeniy Retyunskiy, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 16/455,147

(22) Filed: Jun. 27, 2019

(51) Int. Cl.
*H04L 29/08* (2006.01)

(52) U.S. Cl.
CPC .............................. *H04L 67/1029* (2013.01)

(58) Field of Classification Search
CPC .................................................. H04L 67/1029
See application file for complete search history.

(56) References Cited

U.S. PATENT DOCUMENTS

| | | | | |
|---|---|---|---|---|
| 10,104,169 B1 * | 10/2018 | Moniz | ................. | H04L 67/1002 |
| 10,171,371 B2 * | 1/2019 | Anwar | ................ | H04L 67/1097 |
| 10,574,584 B1 * | 2/2020 | Young | ................. | H04L 41/0823 |
| 2004/0267920 A1 * | 12/2004 | Hydrie | .................. | H04L 67/101 709/223 |
| 2018/0210763 A1 * | 7/2018 | Kumar | .................... | G06F 9/505 |

OTHER PUBLICATIONS

Barr, Jeff, "New Network Load Balancer—Effortless Scaling to Millions of Requests per Second", AWS News Blog, in Elastic Load Balancing, Launch, News, Sep. 7, 2017, 12 pages.

* cited by examiner

*Primary Examiner* — Esther B. Henderson
*Assistant Examiner* — Nazia Naoreen
(74) *Attorney, Agent, or Firm* — Nicholson De Vos Webster & Elliott LLP (57) ABSTRACT

Techniques are described for scaling resources used by a load balancer service responsive to capacity changes associated with a target group of virtualized computing resources to which the load balancer service distributes application traffic. A load balancer service of a service provider network obtains a resource scaling indication indicating a change in a number of virtualized computing resources in a target group of virtualized computing resources associated with a user of the provider network. The load balancer service determines, based at least in part on the resource scaling indication, a scaling factor indicating a relative increase of the number of the number of virtualized computing resources in the target group. Based on the scaling factor, the load balancer service scales a respective amount of provider network resources available for use by each component of a plurality of components of the load balancer service.

20 Claims, 8 Drawing Sheets

FIG. 8

PREDICTIVE LOAD BALANCER CAPACITY SCALING

BACKGROUND

Service provider networks have enabled businesses and other organizations to more easily develop, deploy, and scale virtually any type of computing workload using various types of computing resources. Service provider networks generally provide users with the ability to use compute resources (e.g., by hosting virtual machine (VM) instances or containers, executing batch jobs, executing code without provisioning servers, and so forth), data/storage resources (e.g., object storage, block-level storage, data archival storage, databases and database tables, and so forth), network-related resources (e.g., configuring virtual networks including groups of compute resources, content delivery networks (CDNs), Domain Name Service (DNS)), application resources (e.g., databases, application build/deployment services), and the like.

As demand for certain types of user workloads (e.g., web applications, etc.) grows, users sometimes further rely on load balancer services offered by such provider networks. A load balancer service can be configured to distribute incoming application traffic across multiple targets, such as VM instances, containers, and other types of virtualized computing resources to help balance varying levels of application traffic. The use of such load balancing features can help improve the scalability, performance, and security of user applications, among other benefits.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for proactively scaling resources used at each component in a load balancer pipeline in response to anticipated increase in demand for an application to which the load balancer distributes traffic. The anticipated increase in demand can be identified responsive to scaling changes made for a target group of virtualized computing resources to which the load balancer service distributes application traffic. For example, a user responsible for the virtualized computing resources may increase the number of resources in expectation of an increase in demand for the resources. According to some embodiments, a load balancer service of a service provider network obtains a resource scaling indication indicating a change in a number of virtualized computing resources in a target group of virtualized computing resources associated with a user of the provider network, where application traffic destined for the target group is distributed to the virtualized computing resources by the load balancer service. In some embodiments, the load balancer service further obtains historical data reflecting an amount of application traffic destined for the target group of virtualized computing resources over time. The load balancer service determines, based at least in part on the resource scaling indication and/or historical scaling/capacity data, a scaling factor indicating a relative increase in the number of virtualized computing resources in the target group. Based on the scaling factor, the load balancer service scales a respective amount of provider network resources available for use by each component of a plurality of components of the load balancer service. In this manner, the load balancer service is able to proactively scale the resources used by the load balancer service responsive to predicted changes in application traffic directed to a target group of virtualized computing resources.

In some embodiments, a provider network includes a load balancer service that users can use in coordination with other virtualized computing services of the provider network. At a high level, a load balancer distributes incoming application traffic across multiple virtualized computing resources (e.g., virtual machine (VM) instances, containers, and so forth), where the volume of such incoming traffic may vary over time. Among other benefits, the ability to distribute incoming application traffic across multiple computing resources increases the fault tolerance, availability, and overall performance of users' applications. A load balancer, for example, can serve as a single point of contact for application traffic so that instances behind the load balancer can be scaled without disrupting the overall flow of requests to an application.

Such load balancer services generally attempt to scale the resources used by components of the service as application traffic to various target groups changes over time. However, these scaling actions are largely reactive in existing load balancer services; that is, the scaling occurs only in response to the load balancer service detecting an increase or decrease in the amount of application traffic that it is currently receiving. Reactive scaling can work well for gradual traffic volume changes but often places significant strain on load balancing resources during "high velocity" events in which one or more target groups experience a relatively sudden and significant increase in application traffic. The inability of a load balancer service to sufficiently scale its own resources in response to such high velocity and other unanticipated events can consequently impact the performance of target group applications which rely on the performance of the load balancer service.

Moreover, the functionality provided by a load balancer service is typically implemented by several separate components involved in the network path between incoming application traffic and users' virtualized computing resources (e.g., separate components implementing internal routing functionality, Transport Layer Security (TLS) endpoint management, and the like). The reactive scaling of such components as described above is typically performed independently for each component in a load balancer pipeline. To illustrate, a first component in the load balancer pipeline may be scaled prior to the others in response to an increase in incoming traffic. However, until the first component is scaled to allow more traffic to pass through, the next component in the pipeline will not be triggered to scale. Accordingly, reactive load balancer scaling can cause a cascade of component scaling, where a last component in the pipeline is scaled up only after all previous components have been scaled up, thereby allowing more traffic to reach the final component. As such, the piecemeal scaling of such components in a load balancing pipeline can often cause cascading issues for downstream load balancer components that notice such scaling needs later than others.

According to embodiments described herein, instead of scaling only reactively to changes in application traffic, a load balancer service proactively scales its resources across all components. This proactive scaling can be triggered, for example, by monitoring resource scaling activity associated with target groups and by optionally further analyzing historical data reflecting an amount of application traffic destined for target groups. This data can be used to predict instances of traffic volume increases in advance of such increases. For example, if a user associated with a target group doubles the number of compute instances in the target group in anticipation of a future event known to the user, the load balancer service can take this user-initiated scaling into account and scale its own resources accordingly before the event occurs. Similarly, if a user's target group historically scales its capacity on a recurring basis (e.g., every Friday, or the last week of every month, or on other dates relevant to the user), the load balancer service can account for such historical trends and proactively scale ahead of the recurring schedule. In other examples, the load balancer service can analyze data from other services and data sources or any combinations thereof to identify leading indicators of application traffic volume changes for a target group and scale load balancer resources accordingly.

As described above, a load balancer service described herein can take into account any combination of information from various services and historical data sources to scale its own resources in advance of predicted traffic volume changes to target groups. Furthermore, such proactive scaling can be coordinated across multiple components of a load balancing pipeline in a manner that mitigates issues related to uneven scaling of pipeline resources. Among other benefits, the proactive scaling of load balancing resources improves the use and performance of load balancing resources, thereby improving the performance of any target resources relying on the load balancer service.

Figure 1:
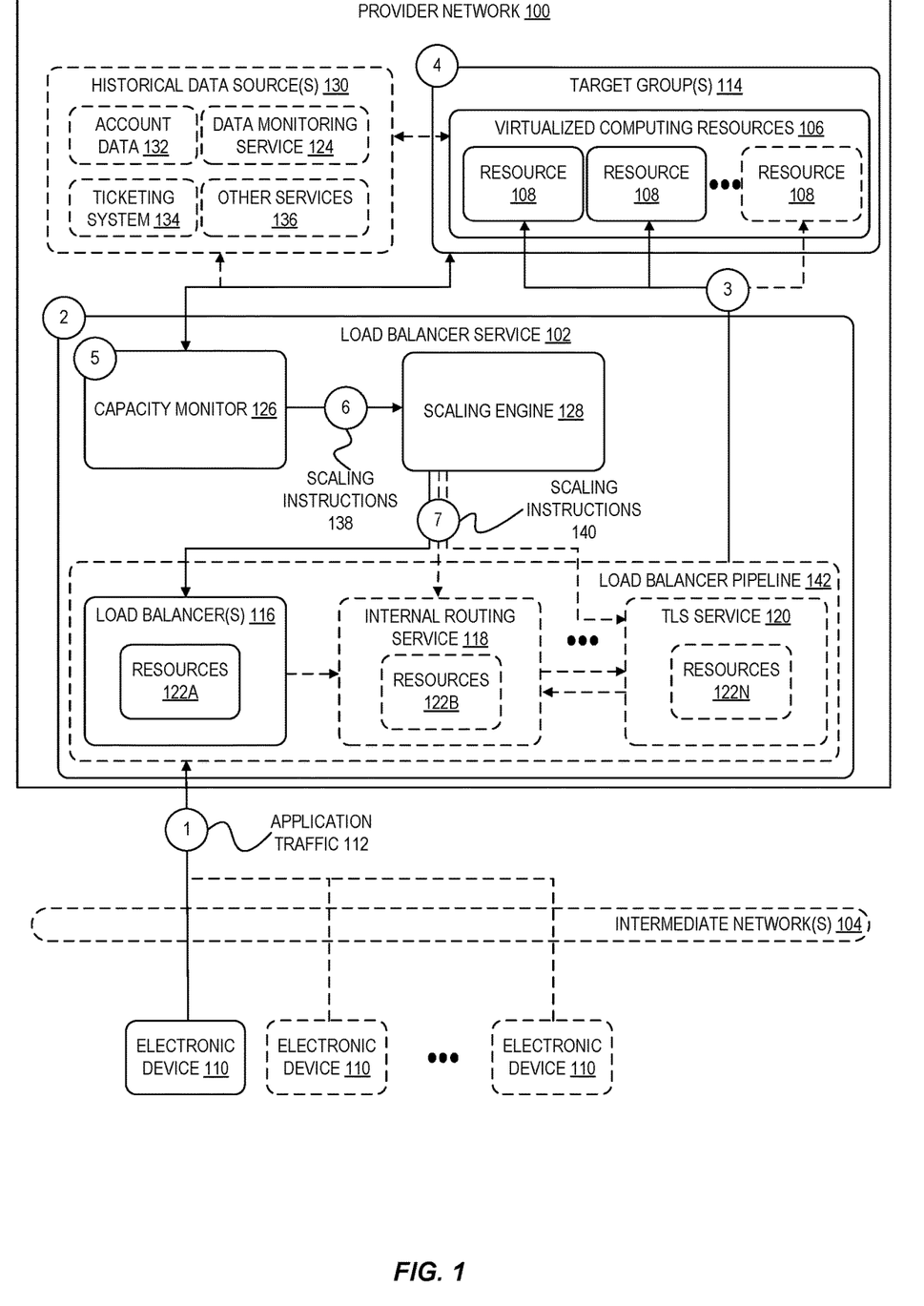
FIG. 1 is a diagram illustrating an environment for scaling resources used by a load balancer service responsive to capacity changes associated with a target group of virtualized computing resources to which the load balancer service distributes application traffic, according to some embodiments.

FIG. 1 is a diagram illustrating an environment for scaling service provider network 100 resources used by a load balancer service responsive to capacity changes associated with a target group of virtualized computing resources to which the load balancer service distributes application traffic. In some embodiments, a load balancer service 102, as well as any number of other possible services, operate as part of a service provider network 100 and comprises one or more software modules executed by one or more electronic devices at one or more data centers and geographic locations. User(s) using one or more electronic device(s) (which may be part of or separate from the service provider network 100) can interact with the various services of the service provider network 100 via one or more intermediate networks, such as the internet.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 104 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As indicated above, it is desirable for a service provider network 100 to scale resources used by a load balancer service 102 in anticipation of changes to a volume of network or application traffic destined for various target groups of resources. Consider an example user or business organization that has implemented a web application running on virtualized computing resources 106, where the virtualized computing resources 106 generally include a scalable number of resources 108 such as VM instances, containers, etc. The user, for example, might manage the virtualized computing resources 106 such that the total capacity of the resources changes in size in response to changes in demand for the user's web application. These capacity changes can be implemented manually by the user (for example, when the user is aware of a special event or other condition that is expected to change demand for the resources) or, in other examples, the capacity can be scaled automatically by a service of the service provider network 100 at which the resources are managed (for example, based on automated scaling features provided by the service).

At the circle labeled "1" in FIG. 1, one or more electronic devices 110 generate application traffic 112 that is directed to virtualized computing resources 106 managed by one or more services of the provider network 100. The application traffic 112, for example, can be generated by the electronic devices 110 as part of the devices' interaction with an application or service provided by the resources 108 such as for example, a web application, database application, or the like. The electronic devices 110 thus generally represent any type of client device that can communicate with a network-accessible application or service such as, for example, desktop computers, laptop computers, mobile devices, gaming devices, set-top boxes (STB), servers, sensors, and the like. The amount of traffic generated by the electronic devices 110 for a particular application can vary over time in response to changes in the time of the day, day of the week, special events, overall popularity of the application or service, or in response to any other conditions.

At circle "2," the load balancer service 102 receives the application traffic 112 and, at circle "3," distributes the traffic to resources 108 associated with one or more target groups 114. In some embodiments, to configure load balancer services for a user's application, the user configures one or more "listeners." A listener checks for connection requests from clients (such as electronic devices 110), based on a configured protocol and port, and forwards requests to one or more registered instances (referred to herein as "targets," such as one or more resources 108). The registered targets can be located in one or more defined availability zones or areas, each of which representing an isolated location for resources used generally to increase an application's fault tolerance. Thus, users may register target resources 108 in multiple availability zones or areas such that if one availability zone or area becomes unavailable or has no healthy targets, the load balancer service 102 can continue to route traffic to healthy targets in another availability zone. In some embodiments, a load balancer service 102 also monitors the health of users' registered target resources and ensures that traffic is routed only to healthy targets. In general, the distribution of the application traffic to a user's target group resources can be based on various load balancing configurations, ongoing health checks of resources, among any number of other factors.

As illustrated in FIG. 1, the network path between the electronic devices 110 and the user's resources 108 may traverse any number of components within a load balancer pipeline 142 of the load balancer service 102 such as, for example, load balancer(s) 116, an internal routing service 118, a Transport Layer Security (TLS) service 120, among other possible components depending on the implementation of the load balancer service 102 and configuration of the service by a user associated with a corresponding target group(s) 114. As shown, when configured for use by a user, each of these components of a load balancer service 102 pipeline runs on respective resources 122A, 122B, 122N (e.g., including VM instances, containers, and the like), which can be scaled independently for each user of the service. For example, load balancer 116, internal routing service 118, and TLS service 120 resources can be scaled up for a particular user associated with an application traffic-intensive application compared to another user associated with a less traffic intensive application. In some embodiments, some users may use more of the load balancer service 102 components than others depending on each user's particular configuration (for example, a user may utilize resources associated with the TLS service 120 only if the user has configured use of such TLS services for the user's application). Although only a limited number of load balancing pipeline components are shown in FIG. 1, in general, a load balancer service 102 can include any number of components that use independent or overlapping sets of resources during operation. As shown, the pipeline may also include some services that are possibly used more than once in the network path between the electronic devices 110 and the user's resources 108.

Furthermore, although the example shown in FIG. 1 illustrates the use of a load balancer service 102 in connection with a single user's resources 108, in general, the load balancer service 102 can concurrently provide load balancing functionality for any number of users of the provider network 100 and for any number of separate target groups associated with those users. In some embodiments, some or all resources used by the load balancer service 102 for each user (including the resources used by each of the load balancing pipeline components) can be run in multi-tenant computing environments such that physical hardware and other resources are possibly shared among multiple different users of the provider network 100.

At circle "4" in FIG. 1, the virtualized computing resources 106 of the target groups 114 process the incoming application traffic. In some embodiments, some of all resources 108, and underlying hardware and software supporting the resources 108, are configured to periodically emit or otherwise send various performance metrics to a data monitoring service 124 of the provider network 100 during operation. A data monitoring service 124 generally collects monitoring and operational data in the form of logs, metrics, and events, related to virtually any type of computing resource of a service provider network 100. As described hereinafter, in some embodiments, metrics collected by a data monitoring service 124 from resources 108 can be obtained by a capacity monitor 126 and used as input to predictive scaling determinations made by the capacity monitor 126. In some embodiments, metrics may be collected and stored by a data monitoring service 124 separately for various different user applications and workloads, for example, where each workload can be associated with a separate "namespace" used to identify the workload's metrics at the data monitoring service 124. As shown in FIG. 1, a data monitoring service 124 represents one of possibly several sources of historical data reflecting the status of a user's target group(s) 114 over time, where other such historical data sources are described in more detail hereinafter.

At circle "5" in FIG. 1, in some embodiments, a capacity monitor 126 of the load balancer service 102 obtains a resource scaling indication, and possibly other historical data, related to the target groups 114. As indicated above, in general, the capacity monitor 126 obtains such resource scaling indications and historical data to monitor for recent changes and/or anticipated changes to the capacity associated with a user's target groups 114 with the assumption that such changes represent a leading indicator of an increase in application traffic to be received by the load balancer service 102 for the corresponding target group(s) 114. In some embodiments, these indicators can be used to preemptively scale the resources used by the load balancer service 102 for the target group(s) 114 in advance of such application traffic increases so that the load balancer service 102 can be better prepared for such application traffic increases.

In some embodiments, the capacity monitor 126 and scaling engine 128 run on resources managed by the load balancer service (e.g., one or more VM instances, containers, etc.) and are associated with a separate account of the provider network 100 that is granted trust relationships to access data from the target group(s) 114, various historical data sources 130, and to send scaling instructions to various components of the load balancer service 102, as described hereinafter. For example, the capacity monitor 126 may be configured to periodically poll the capacity status of target group(s) 114, or to receive capacity status updates from the target group(s) 114, in order to identify changes in the number of resources assigned to the target group(s). In some embodiments, a capacity monitor 126 may additionally or alternatively obtain such capacity information indirectly, for example, by monitoring log data generated by the target group(s) and consumed by a data monitoring service 124 or based on data available from any other data sources.

In some embodiments, a capacity monitor 126 may further obtain various types of historical data related to a user's target group(s) 114, such as historical metric data obtained from a data monitoring service 124, user account data 132 obtained from the provider network 100, support tickets obtained from a IT support ticketing system 134, or data obtained from any other service 136 of the service provider network 100 with which resources 108 may interact (e.g., database services, queue services, and the like). In general, the data obtained by the capacity monitor 126 may include both real-time information about changes to the capacity available to a user's target group(s) as well as historical data indicating how the capacity of the target groups has changed over time, types of events that are correlated with increases to application traffic associated with the target groups, and any other information that can help the capacity monitor predict whether an increase or decrease in application traffic destined for the target group(s) is likely to occur in the future.

In some embodiments, based on the resource scaling indication and/or historical data obtained by the capacity monitor 126, the capacity monitor 126 generates one or more scaling predictions and associated scaling factors. The scaling predictions, for example, indicate times or windows of time at which the capacity monitor 126 predicts there is likely to be a change in the volume of application traffic destined for the target group(s) 114. As indicated above, such scaling predictions can be based on identifying user-initiated or automatic changes to the capacity of the target group(s) 114. Such scaling predictions may also be generated based on an analysis of historical data reflecting application traffic patterns in the past (for example, using autoregressive models, machine learning based on recurrent neural networks (RNNs) or other time series forecasting models, or other forms of predictive modeling and probabilistic forecasting known to those of skill in the art). For example, a model can be trained to predict whether to scale up or scale down based on a set of input signals related to a user's target group(s) or other components. Based on the current traffic directionality, historical data, and other input signals (e.g., time of day, holidays, etc.), the model can be used to determine a scaling factor to use in response to detection of certain conditions.

As another example, the capacity monitor may analyze tickets logged by a ticketing system 134 to identify past instances where users have had issues dealing with application traffic spikes and build a dependency graph indicating events that historically have been likely to instigate such issues. In some embodiments, the capacity monitor 126 can perform correlation searches and other analyses across current resource scaling indications, historical data, user account data, ticket data, and other data sources to identify likely indicators of application traffic increases or decreases.

In some embodiments, assuming that the capacity monitor 126 generates one or more scaling predictions, the capacity monitor 126 further determines a scaling factor associated with such predictions. For example, the scaling factor generally provides a normalized value indicating a relative expected increase in the amount of application traffic destined for the target group(s) 114. For example, if the capacity associated with a target group 114 suddenly increases from 100 VM instances to 125 VM instances, the capacity monitor 126 may associate this increase with a normalized value of 0.25 to indicate that the capacity increased by 25% (rather than specifically noting an increase of 25 VM instances). As described hereinafter, the normalized scaling factor can be used by various different components of a load balancer service 102 to scale their own resources accordingly. In the previous example, each component may scale up their own resources by approximately 25%, which may correspond to different absolute amounts of resources depending on the nature of the component and each component's own scaling algorithm.

At circle "6" in FIG. 1, once the capacity monitor 126 has generated one or more scaling predictions and one or more corresponding scaling factors, in some embodiments, the capacity monitor 126 sends scaling instructions 138 to a scaling engine 128 that is responsible for communicating scaling instructions to various components of the load balancer service 102. The scaling instructions 138, for example, may include one or more of indications of future times at which the capacity monitor expects resources associated with one or more target group(s) to increase or decrease, a scaling factor indicating a relative scale of the capacity change at each time, a velocity with which to scale the components resources, or any combinations thereof. The scaling engine 128 may then be responsible for sending scaling instructions 140 at appropriate times to each of the independent components of the load balancer service 102 pipeline. For example, at circle "7," the scaling engine 128 sends further scaling instructions 140 to various components of the load balancer service 102, where each such service can scale respective resources 122A, 122B, . . . 122N, according to the scaling factor(s) and respective scaling algorithms implemented by each component (or, in some examples, by a common scaling algorithm across the pipeline components).

Figure 2:
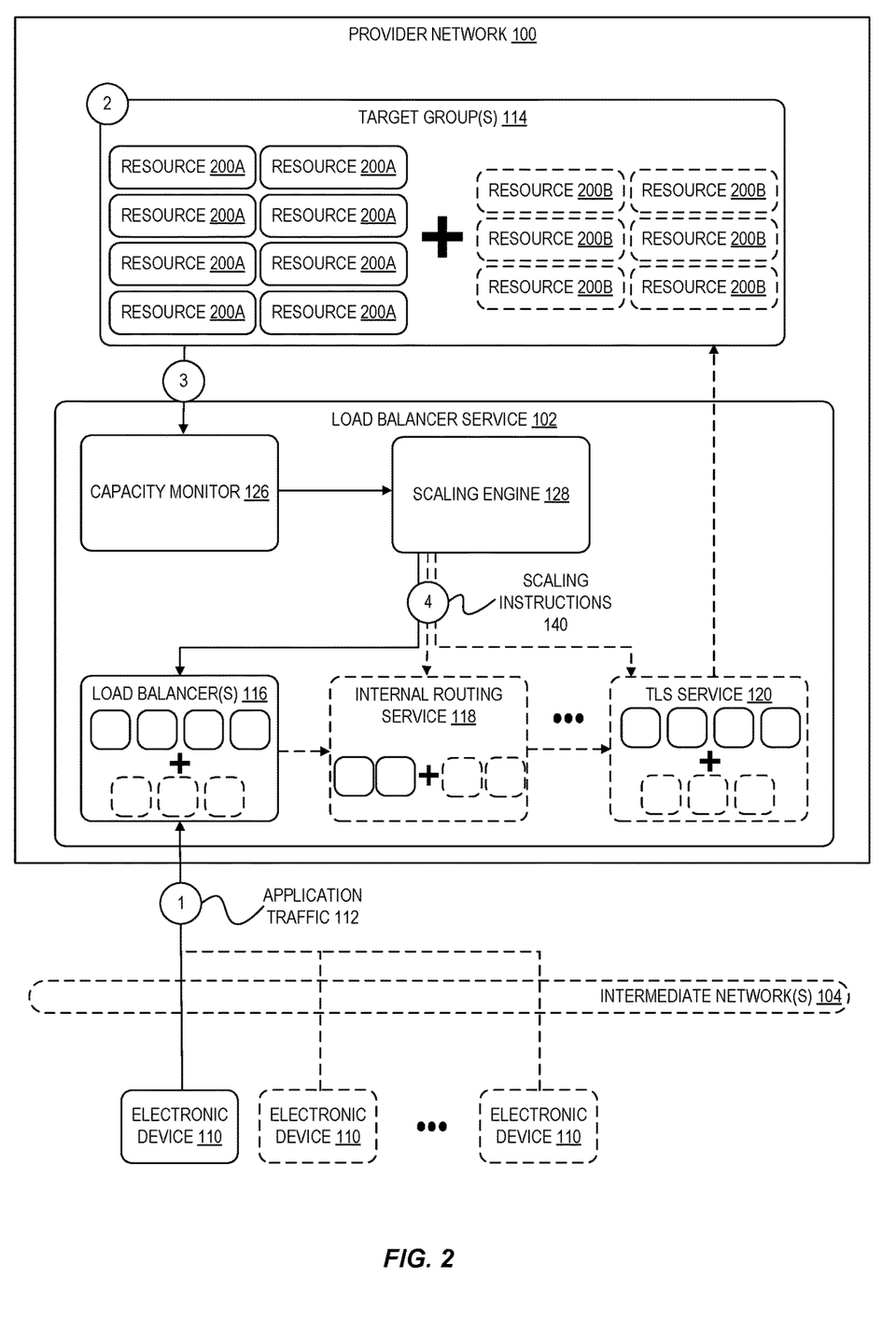
FIG. 2 is a diagram illustrating an example of scaling up resources associated with multiple components of a load balancer service responsive to capacity changes associated with a target group of virtualized computing resources, according to some embodiments.

FIG. 2 is a diagram illustrating an example of scaling up resources associated with multiple components of a load balancer service responsive to capacity changes associated with a target group of virtualized computing resources. The example shown in FIG. 2, for example, illustrates the proportional scaling of various components of a load balancer service 102 based on a normalized (or otherwise relative) scaling factor determined by a capacity monitor 126 or scaling engine 128 as described in FIG. 1. Similar to FIG. 1, one or more electronic devices 110 generate application traffic 112 that is directed to virtualized computing resources 200A of the target group(s) 114, where the load balancer service 102 distributes the traffic to the resources of the target group(s) 114.

As shown in FIG. 2, at some point in time, resources 200B are added to the target group 114 to supplement the resources 200A. For example, a user may manually add the resources 200B to the target group(s) 114 in anticipation of a known event expected to increase application traffic, or a service of the provider network 100 may have added the resources 200B automatically in response to an expected increase in application traffic. In this example, a capacity monitor 126 identifies the increase in capacity associated with the target group(s) 114 and determines a scaling factor associated with the increase. In FIG. 2, the number of resources assigned to the target group(s) 114 increased from 8 to 14, representing a 75% increase in the amount of resources or a normalized scaling factor of 0.75.

At circle "4" in FIG. 2, based on the scaling factor determined by the capacity monitor 126, the scaling engine 128 sends scaling instructions to various components of the load balancer service 102. As shown in FIG. 2, each of the load balancer 116, internal routing service 118, and TLS service 120 components of the load balancer service 102 independently scale based on the scaling instructions 140 and associated scaling factor. For example, a load balancer 116 may increase a total number of associated VM instances or other virtualized computing resources from 4 to 7 based on the scaling factor, whereas an internal routing service 118 may scale an associated number of resources from 2 to 4 (for example, at least exceed the indicated scaling factor), and a TLS service may scale from 4 to 7 resources.

Although many of the examples described herein relate to examples of scaling up the resources of various load balancer service 102 components, in some embodiments, similar techniques can be used to scale down the amount of resources used by the load balancer service 102. A load balancer service 102 may scale down resources more conservatively than it scales up resources to err on the side of having excess resources available for users of the load balancer service 102.

Figure 3:
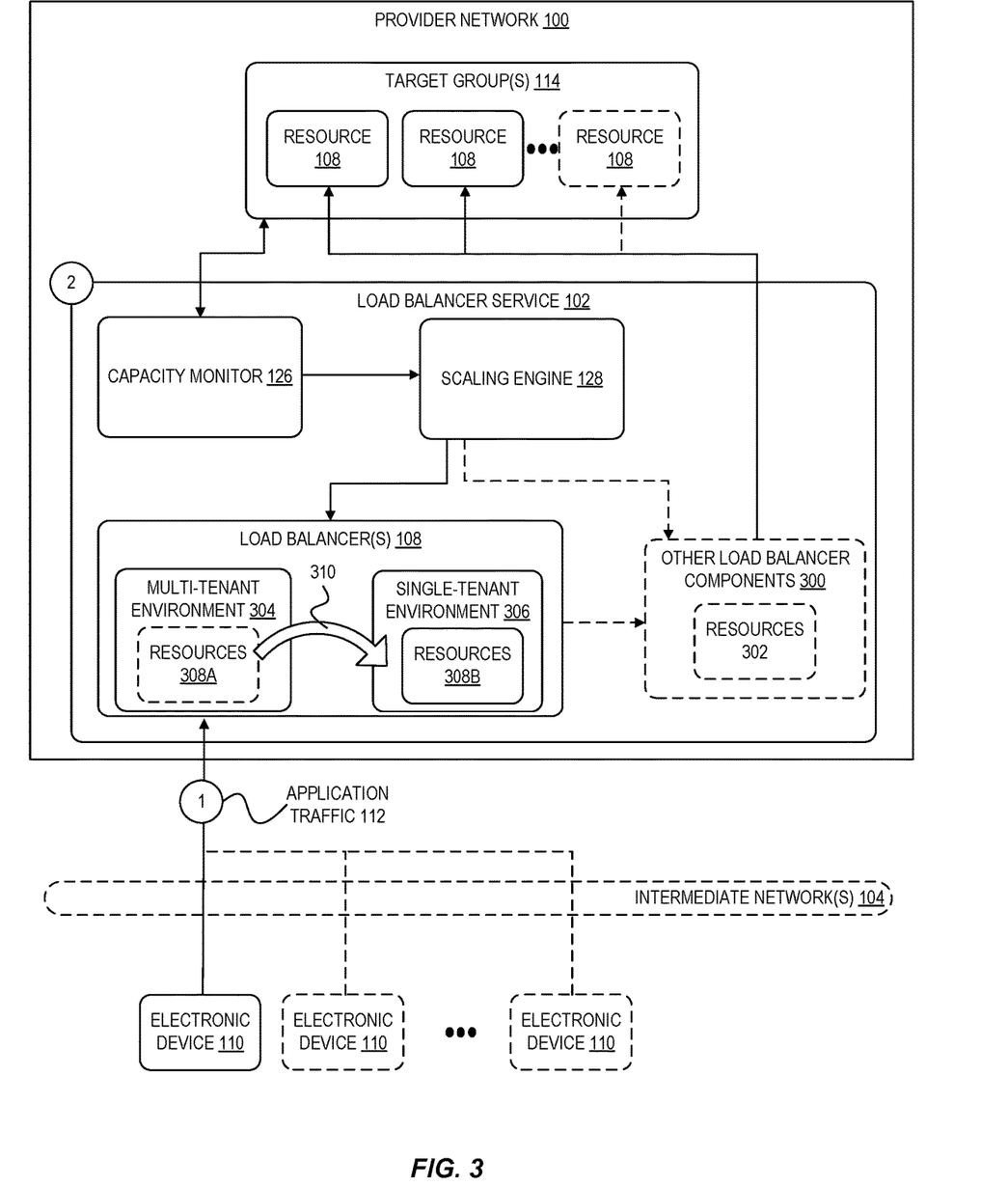
FIG. 3 is a diagram illustrating an example of migrating load balancer resources running in multi-tenant computing environments to single-tenant computing environments responsive to capacity changes associated with a target group of virtualized computing resources, according to some embodiments.

FIG. 3 is a diagram illustrating an example of migrating load balancer resources running in multi-tenant computing environments to single-tenant computing environments responsive to capacity changes associated with a target group of virtualized computing resources. In some embodiments, for example, scaling instructions sent to one or more components of the load balancer service 102 can include instructions to migrate resources from multi-tenant computing environments to single-tenant computing environments. For example, if a load balancer service 102 is anticipating a significant application traffic increase for a user's target group, it may be desirable to migrate the load balancer resources associated with that user from hardware resources shared by other users to single-tenant computing environments so that the increase in traffic does not negatively affect neighbor users. Furthermore, a single-tenant environment provides more flexibility for a user to further scale associated resources, if needed.

In FIG. 3, for example, in response to receiving scaling instructions from the scaling engine 128, resources 308A running in a multi-tenant environment 304 are migrated 310 to a single-tenant environment 306. The load balancer service 102 can then direct new requests to the resources 308B running in the single-tenant environment 306 while gradually draining connections from the multi-tenant environment 304. In some embodiments, the size of the single-tenant environment (e.g., the number of resource instances and possibly physical hosts) is initially determined based on the scaling factor received from the scaling engine 128 and the user's current capacity. In other examples where the resources 308A are already running in single tenant environment, then the load balancer service 102 can instead increase the size of the single tenant environment, if needed. In some embodiments, resources migrated to a single-tenant environment can be migrated back to multi-tenant once the load balancer service 102 predicts that the user's capacity needs are likely to be satisfied for the foreseeable future (for example, because the capacity monitor 126 predicts a sustained decrease in the amount of application traffic to be received by the user's corresponding target group(s) 114). Although in FIG. 3 the migration of resources from a multi-tenant environment 304 to a single-tenant environment 306 is shown for a single component, similar processes can be used for any number of other load balancer components 300 associated with respective resources 302.

Figure 4:
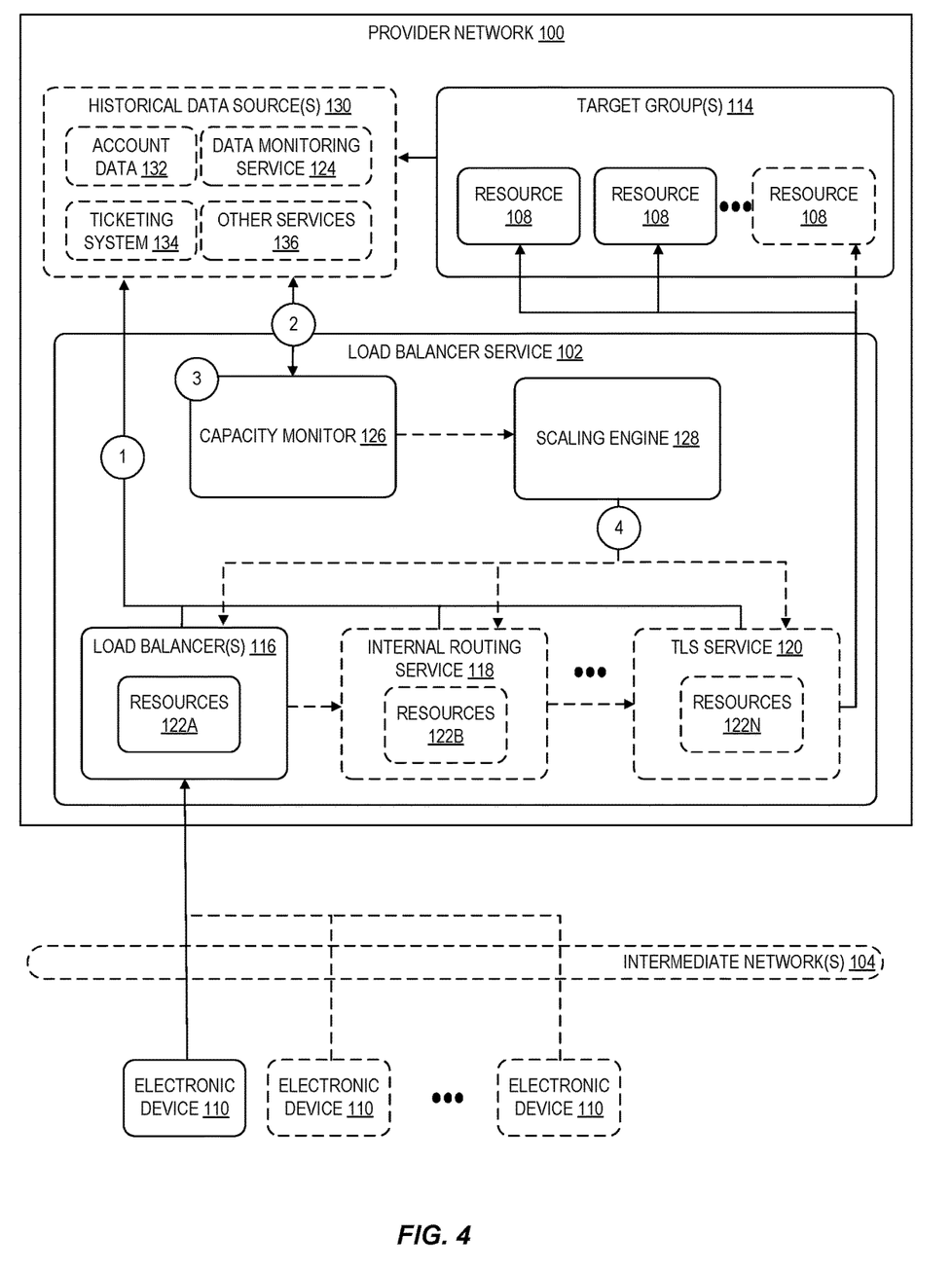
FIG. 4 is a diagram illustrating a load balancer service monitoring the effectiveness of instructed scaling actions and performing further scaling actions if it is determined that the load balancer resources remain under scaled according to some embodiments.

In some embodiments, once a load balancer service 102 scales resources associated with various components of the service, the service 102 can further monitor performance of the components to ensure that the mitigation actions were sufficient and, if it is determined that the scaling actions were insufficient, further scale the resources. FIG. 4 is a diagram illustrating a load balancer service monitoring the effectiveness of load balancer service scaling actions and performing further scaling actions if it is determined that the load balancer service resources remain under scaled.

In FIG. 4, after various components of the load balancer service 102 are scaled by a capacity monitor 126 and scaling engine 128, at circle "1," the component resources emit performance metrics to an external service such as a data monitoring service 124. In other embodiments, the various components send metrics directly to a capacity monitor 126. At circle "2" in FIG. 4, the capacity monitor 126 obtains the performance metrics and, at circle "3," determines whether the proactive scaling actions were successful. For example, the capacity monitor 126 can determine whether one or more performance metrics associated with the resources are below or exceed one or more defined thresholds (for example, whether CPU utilization, memory utilization, network utilization, or any combination thereof, is below one or more defined thresholds). If it is determined, for example, that the resources for one or more of the load balancer service 102 components remain under scaled, the capacity monitor can send a further scaling factor to the scaling engine 128, which in turn can cause the corresponding components to further scale an associated amount of resources. In this manner, the capacity monitor 126 and scaling engine 128 can fine-tune the proactive scaling of load balancer service 102, for example, in the case that an actual application traffic increase exceeds a predicted increase or based on other circumstances.

Figure 5:
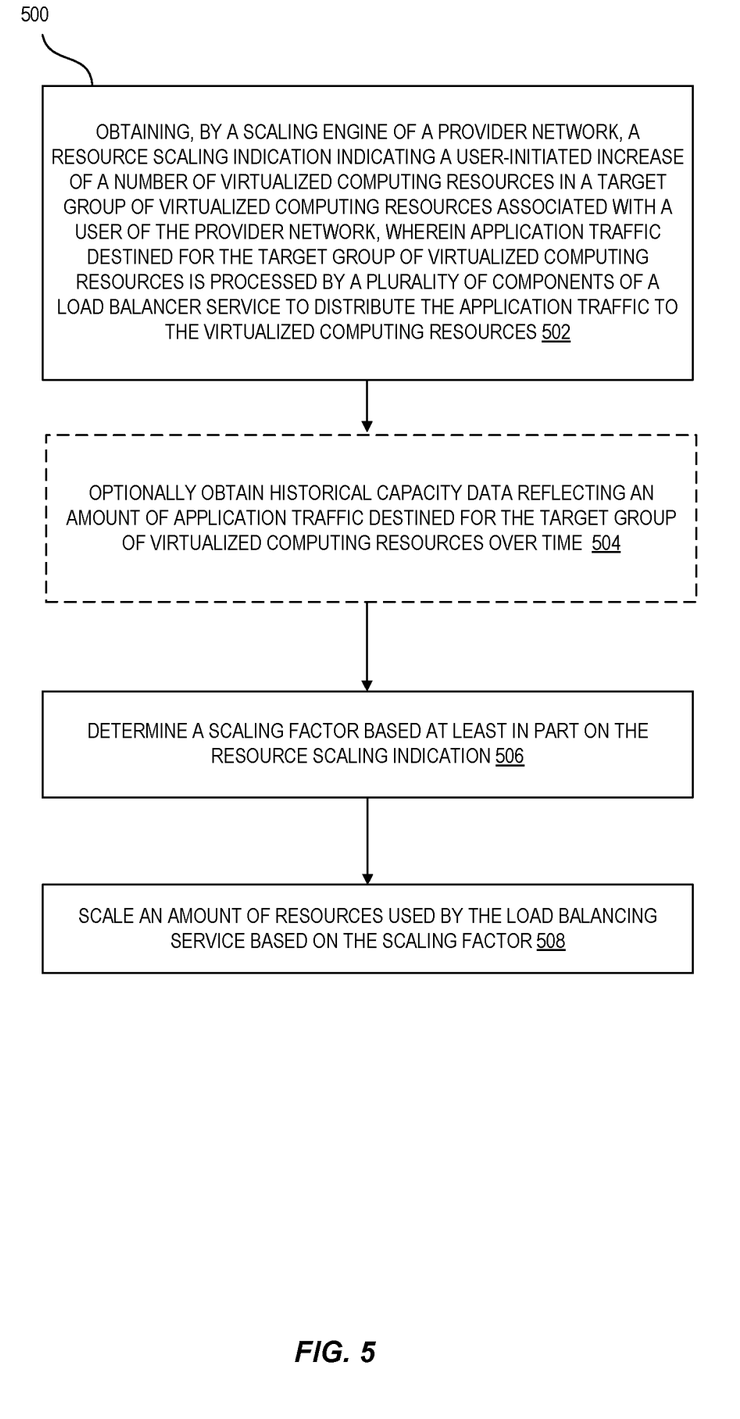
FIG. 5 is a flow diagram illustrating operations of a method for scaling resources used by a load balancer service responsive to capacity changes associated with a target group of virtualized computing resources to which the load balancer service distributes application traffic according to some embodiments.

FIG. 5 is a flow diagram illustrating operations 500 of a method for scaling resources used by a load balancer service responsive to capacity changes associated with a target group of virtualized computing resources to which the load balancer service distributes application traffic according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by various components of a load balancer service 102 of the other figures.

The operations 500 include, at block 502, obtaining, by a scaling engine of a provider network, a resource scaling indication indicating a user-initiated increase of a number of virtualized computing resources in a target group of virtualized computing resources associated with a user of the provider network, wherein application traffic destined for the target group of virtualized computing resources is processed by a plurality of components of a load balancer service to distribute the application traffic to the virtualized computing resources. In some embodiments, the virtualized computing resources include at least one of: virtual machine (VM) instances, containers, internet protocol (IP) addresses, virtualized computing functions, or any combination thereof.

The operations 500 further include, at block 504, optioning obtaining historical resource scaling/capacity data reflecting an amount of application traffic destined for the target group of virtualized computing resources over time. In some embodiments, the operations further include obtaining historical data about the target group from another service of the provider network; and further determining the scaling factor based at least in part on the historical data The operations 500 further include, at block 506, determining a scaling factor based at least in part on the resource scaling indication. In some embodiments, the operations further include determining the scaling factor based at least in part on the historical data. In some embodiments, the operations further include determining the scaling factor by generating a normalized value derived from the change in the number of virtualized computing resources in the target group of virtualized computing resources.

The operations 500 further include, at block 508, scaling an amount of resources used by the load balancer service based on the scaling factor. In some embodiments, the operations further include scaling, based on the scaling factor, a respective amount of resources used by each component of a plurality of components of the load balancer service.

In some embodiments, the operations further include migrating virtualized computing resources used by at least one component of the load balancer service from one or more multi-tenant computing environment to one or more single-tenant computing environments.

In some embodiments, the operations further include obtaining performance data reflecting performance of the resources used by the load balancer service after scaling the amount of resources; determining, based on the performance data, that one or more performance metrics associated with the resources exceed a defined threshold; and further scaling the amount of resources used by the load balancer service.

In some embodiments, the operations further include obtaining metric data associated with the virtualized computing resources in the target group of virtualized computing resources, the metric data including at least one of: central processing unit (CPU) utilization, memory utilization, network saturation, queue size, or any combination thereof; and further determining the scaling factor based at least in part on the metric data.

In some embodiments, the operations further include sending scaling instructions, based on the scaling factor, to each component of a plurality of components of the load balancer service, wherein each component of the plurality of components of the load balancer service applies a respective scaling algorithm based on the scaling factor.

Figure 6:
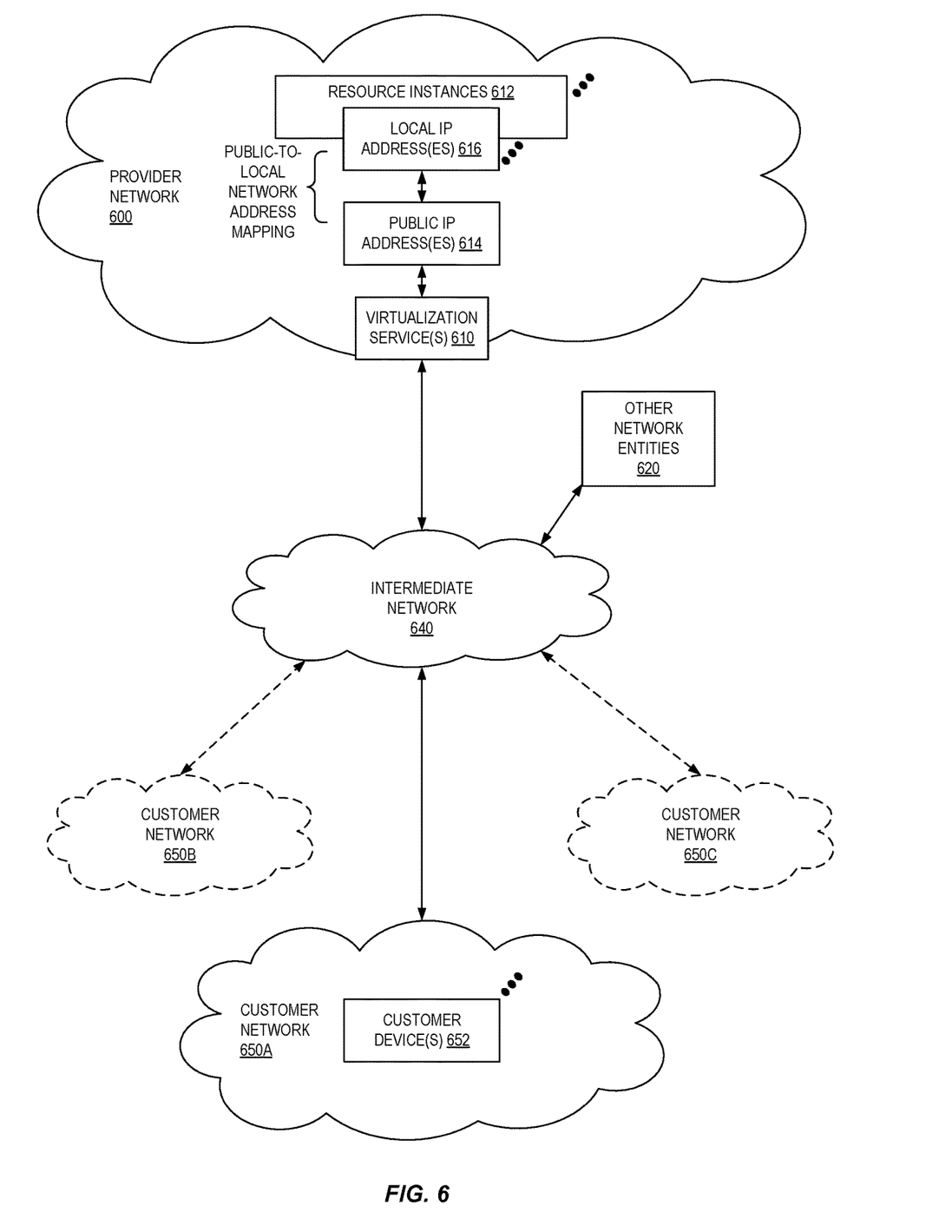
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
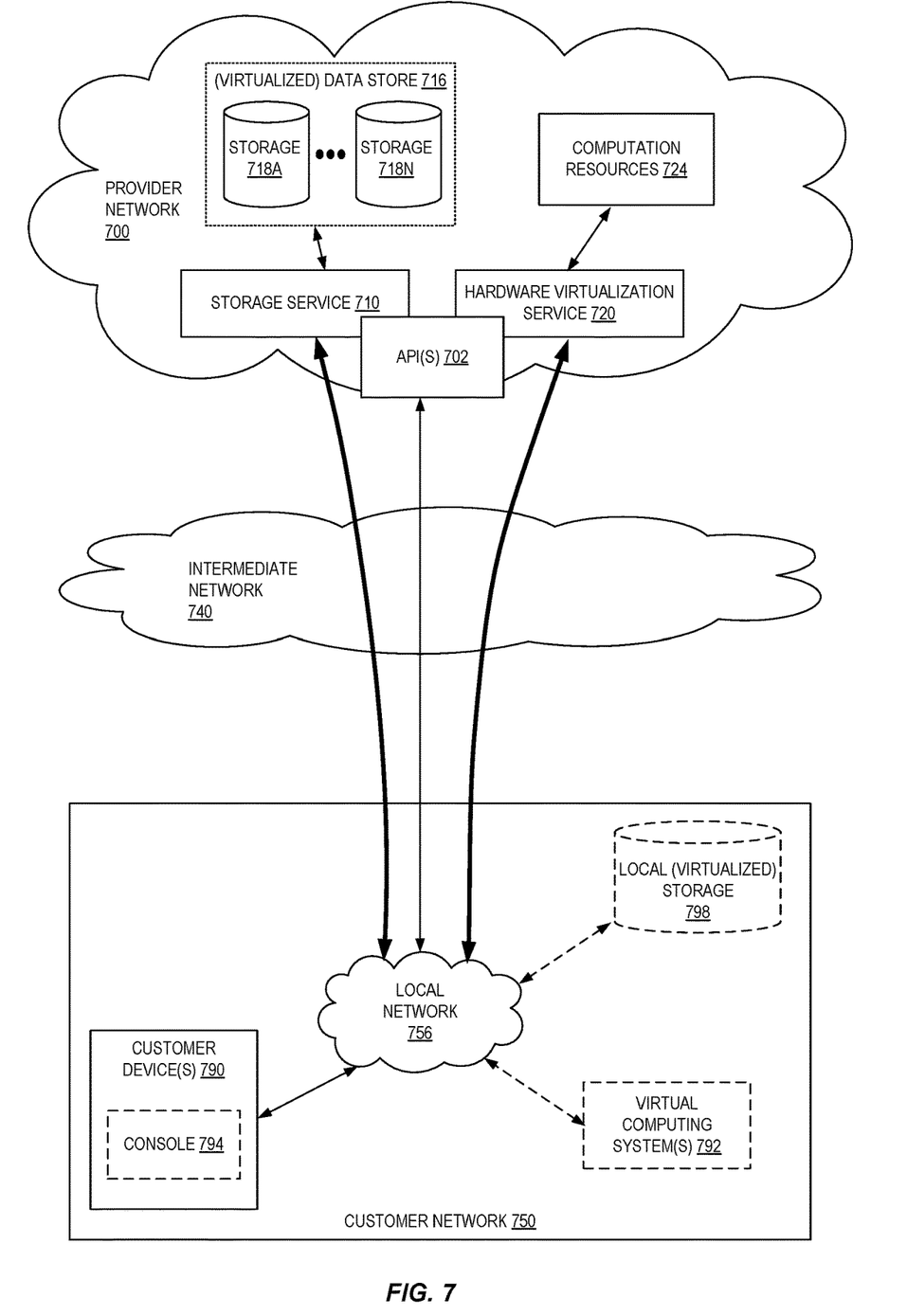
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
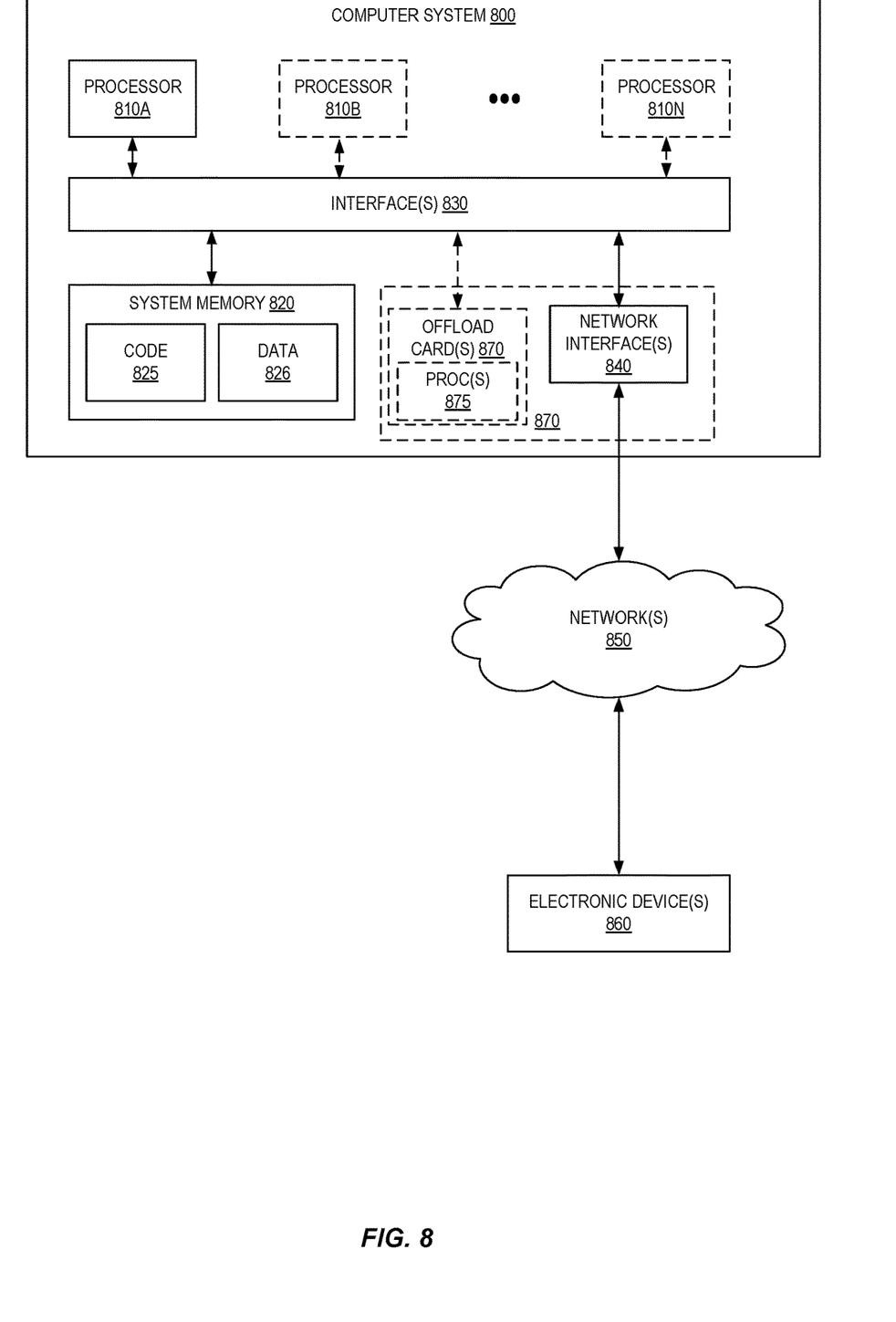
FIG. 8 is a block diagram illustrating an example computer system that may be used in some embodiments.

In some embodiments, a system that implements a portion or all of the techniques for scaling resources used by a load balancer service responsive to capacity changes associated with a target group of virtualized computing resources to which the load balancer service distributes network traffic as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining, by a scaling engine of a provider network, a resource scaling indication indicating a user-initiated increase of a number of virtualized computing resources in a target group of virtualized computing resources associated with a user of the provider network, wherein application traffic destined for the target group of virtualized computing resources is processed by a plurality of components of a load balancer service to distribute the application traffic to the virtualized computing resources;
determining, based at least in part on the resource scaling indication, a scaling factor indicating a relative increase in the number of virtualized computing resources in the target group of virtualized computing resources;
sending, by the scaling engine, scaling instructions including the scaling factor to the plurality of components of the load balancer service; and
scaling, by each component of the plurality of components of the load balancer service based on the scaling factor, a respective amount of provider network resources available for use by each component of the plurality of components of the load balancer service.

2. The computer-implemented method of claim 1, further comprising:
obtaining historical data reflecting an amount of application traffic destined for the target group of virtualized computing resources over time; and
further determining the scaling factor based at least in part on the historical data.

3. The computer-implemented method of claim 1, further comprising migrating virtualized computing resources used by at least one component of the load balancer service from one or more multi-tenant computing environments to one or more single-tenant computing environments.

4. A computer-implemented method comprising:
obtaining a resource scaling indication indicating a change in a number of virtualized computing resources in a target group of virtualized computing resources associated with a user of a provider network, wherein application traffic destined for the target group of virtualized computing resources is distributed to the virtualized computing resources by a load balancer service;
determining a scaling factor based at least in part on the resource scaling indication;
sending the scaling factor to a plurality of components of the load balancer service; and
scaling, by each component of the plurality of components of the load balancer service, an amount of resources used by each component of the load balancer service based on the scaling factor.

5. The computer-implemented method of claim 4, further comprising:
obtaining historical data reflecting an amount of application traffic destined for the target group of virtualized computing resources over time; and
further determining the scaling factor based at least in part on the historical data.

6. The computer-implemented method of claim 4, further comprising migrating virtualized computing resources used by at least one of the plurality of components of the load balancer service from one or more multi-tenant computing environments to one or more single-tenant computing environments.

7. The computer-implemented method of claim 4, wherein application traffic destined for the target group of virtualized computing resources is distributed to the virtualized computing resources by the load balancer service.

8. The computer-implemented method of claim 4, further comprising determining the scaling factor by generating a normalized value derived from the change in the number of virtualized computing resources in the target group of virtualized computing resources.

9. The computer-implemented method of claim 4, wherein obtaining the resource scaling indication comprises a capacity monitor of the load balancer service receiving metrics from a data monitoring service external to the load balancer service.

10. The computer-implemented method of claim 4, further comprising:
obtaining performance data reflecting performance of the resources used by the load balancer service after scaling the amount of resources;
determining, based on the performance data, that one or more performance metrics associated with the resources exceed a defined threshold; and
further scaling the amount of resources used by the load balancer service.

11. The computer-implemented method of claim 4, further comprising:
obtaining metric data associated with the virtualized computing resources in the target group of virtualized computing resources, the metric data including at least one of: central processing unit (CPU) utilization, memory utilization, network saturation, queue size, or any combination thereof; and
further determining the scaling factor based at least in part on the metric data.

12. The computer-implemented method of claim 4, wherein the virtualized computing resources include at least one of: virtual machine (VM) instances, containers, internet protocol (IP) addresses, virtualized computing functions, or any combination thereof.

13. The computer-implemented method of claim 4, further comprising:
obtaining historical data about the target group from another service of the provider network; and
further determining the scaling factor based at least in part on the historical data.

14. The computer-implemented method of claim 4, wherein each component of the plurality of components of the load balancer service applies a respective scaling algorithm based on the scaling factor.

15. A system comprising:
a capacity monitor of a load balancer service implemented by a first one or more electronic devices, the capacity monitor including capacity monitor instructions that upon execution cause the capacity monitor to:
obtain a resource scaling indication indicating a user-initiated increase of a number of virtualized computing resources in a target group of virtualized computing resources associated with a user of a provider network, wherein application traffic destined for the target group of virtualized computing resources is distributed to the virtualized computing resources by the load balancer service, determine, based at least in part on the resource scaling indication, a scaling factor indicating a relative increase of the number of virtualized computing resources in the target group of virtualized computing resources, and send the scaling factor to a scaling engine; and a scaling engine implemented by a second one or more electronic devices, the scaling engine including scaling engine instructions that upon execution cause the scaling engine to send scaling instructions including the scaling factor to each component of a plurality of components of the load balancer service, the scaling instructions causing each component of the plurality of components to scale, based on the scaling factor, an amount of resources available to the component.

16. The system of claim 15, wherein the capacity monitor instructions, upon execution, further cause the capacity monitor to:

obtain historical data reflecting an amount of application traffic destined for the target group of virtualized computing resources over time; and further determine the scaling factor based at least in part on the historical data.

17. The system of claim 15, wherein the scaling engine instructions, upon execution, further cause the scaling engine to migrate virtualized computing resources used by at least one of the components of the load balancer service from one or more multi-tenant computing environment to one or more single-tenant computing environments.

18. The system of claim 15, wherein application traffic destined for the target group of virtualized computing resources is distributed to the virtualized computing resources by the load balancer service.

19. The system of claim 15, wherein the scaling engine instructions, upon execution, further cause the scaling engine to determine the scaling factor by generating a normalized value derived from the change in the number of virtualized computing resources in the target group of virtualized computing resources.

20. The system of claim 15, wherein the scaling engine instructions, upon execution, further cause the scaling engine to:

obtain performance data reflecting performance of the resources used by the load balancer service after scaling the amount of resources;

determine, based on the performance data, that one or more performance metrics associated with the resources exceed a defined threshold; and further scale the amount of resources used by the load balancer service.

* * * * *